Oct. 13, 1959    R. H. DAVIDSON    2,908,529
LATCH FOR DUMP TRUCK TAIL GATES
Filed March 28, 1958
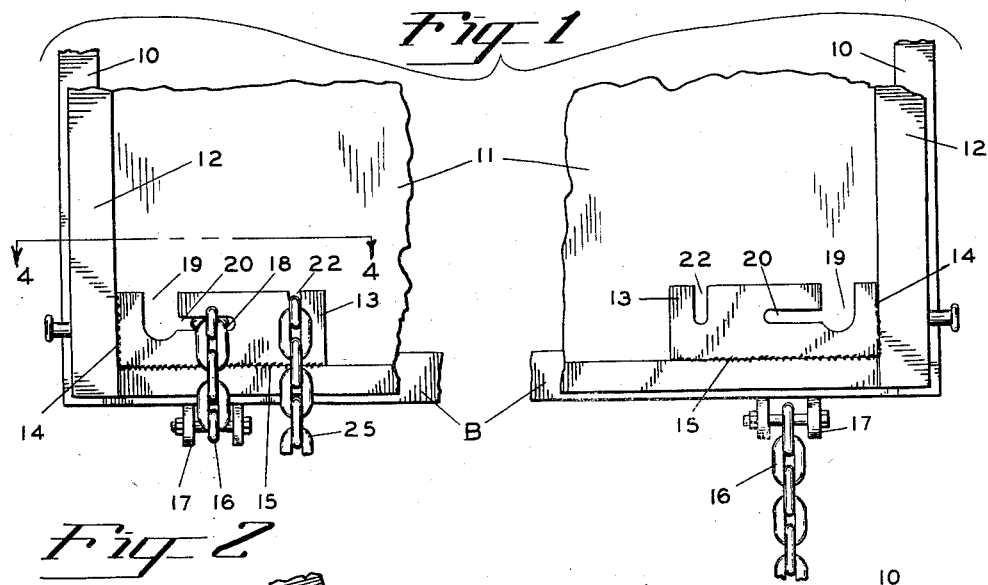
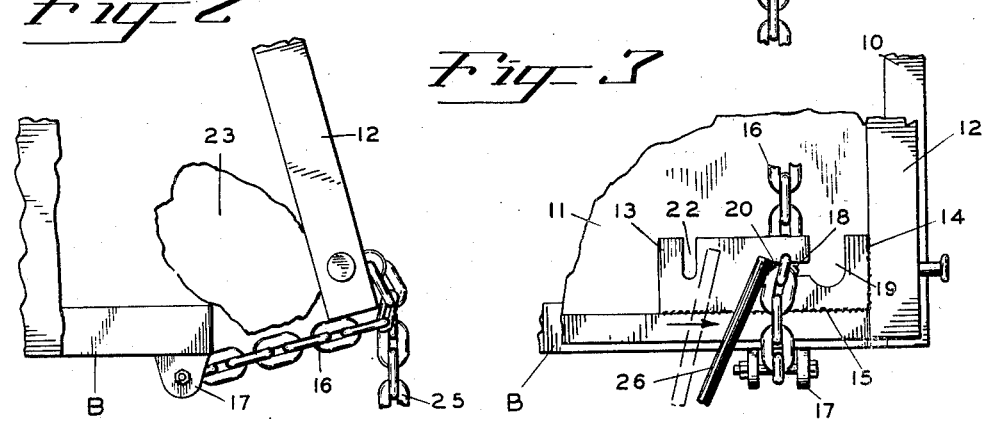
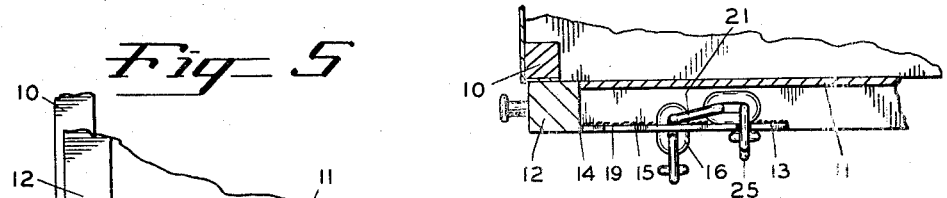
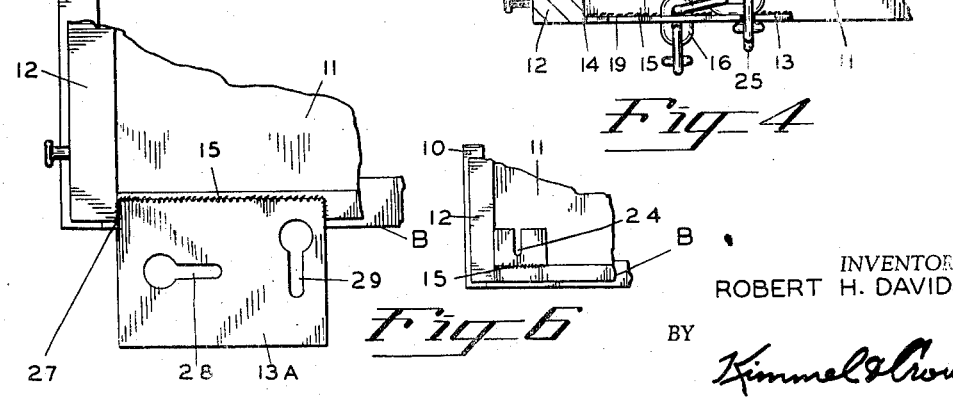
INVENTOR
ROBERT H. DAVIDSON
BY
Kimmel & Crowell

United States Patent Office 2,908,529
Patented Oct. 13, 1959

2,908,529

LATCH FOR DUMP TRUCK TAIL GATES

Robert H. Davidson, Amboy, Wash.

Application March 28, 1958, Serial No. 724,714

2 Claims. (Cl. 296—56)

The present invention relates to tail gates for dump trucks, and more particularly to such a device used in connection with gravel carrying trucks.

The primary object of the invention is to provide a tail gate chain latch wherein the holding chain can be unlatched from the tail gate without slacking the chain.

In the dumping of gravel from gravel trucks, particularly when spreading the gravel by moving the truck, a chain is used to limit the opening of the tail gate. With the present day method of latching the chain for holding the tail gate open a predetermined amount, when a large rock or obstruction jams between the gate and the bottom of the truck, it is impossible to release the chain from the latch, but with this invention it is possible to release the chain without slacking the same, even though the gate is jammed open by an obstruction between the gate and the bottom of the truck.

Other objects and advantages will become apparent in the following specification when considered in the light of the attached drawings, in which:

Figure 1 is a fragmentary rear elevation of the tail gate of a dump truck, partially broken away for convenience of illustration.

Figure 2 is a fragmentary side view of the tail gate and its holding chain showing a large rock jammed between the gate and the bed of the truck.

Figure 3 is a fragmentary rear elevation of the tail gate, illustrating the holding chain being released from the latch.

Figure 4 is a fragmentary horizontal cross-section taken on the line 4—4 of Figure 1, looking in the direction of the arrows.

Figure 5 is a fragmentary rear elevation of a modified latch structure.

Figure 6 is a fragmentary rear elevation of the tail gate latch of conventional present day design.

Referring now to the drawings in detail wherein like reference numerals indicate like parts throughout the several figures, the reference character B indicates generally the bed of a dump truck having the usual sides 10 forming part thereof. A tail gate 11 has the usual extended reinforcing frame 12 extending rearwardly therefrom and is hinged by means (not shown) at its upper end to the sides 10.

My improved latching structure includes a latch plate 13, which is welded to the frame 12 of the tail gate 11 at 14 and 15. A latch chain 16 is connected to the bed B of the truck at 17, in the usual manner. When the gate 11 is to be held from opening beyond the position shown in Figure 2, the link 18 of the chain 16 is brought down through an enlarged opening 19 in the plate 13 and moved into the horizontal slot 20 communicating therewith in the latch plate 13. The chain 16 is then brought across as at 21, Figure 4, and engaged in a vertical slot 22, which holds the link 18 within the horizontal slot 20.

In the event an obstruction, such as a rock 23, enters between the bed B of the truck and the tail gate 11, as illustrated in Figure 2, it has been impossible previously to release the chain from the latch of the type illustrated in Figure 6, due to the necessity of partially closing the gate 11 to permit the chain to be moved upwardly out of the slot 24.

In order to release the chain 16 in the present invention, as illustrated in Figures 1 through 4, the free end 25 of the chain 16 is raised up vertically out of the slot 22, after which the same can be knocked horizontally out of the slot 20 by a bar 26, as illustrated in Figure 3, without having to slack the main run of the chain 16 from the latch plate 13.

In the drawings, we have illustrated the horizontal slot 20 vertically above the chain attachment 17, but this slot 20 could be shifted either to one side or the other so that the chain 16 could be more easily released.

In Figure 5, a modified form of the invention is illustrated where the chain latch plate 13a is connected to the lower edge 27 of the tail gate 11. The horizontal keyhole slot 28 corresponds to the horizontal slot 20 of the latch 13, while the vertical keyhole slot 29 corresponds to the vertical slot 22 of the latch 13, the same principle of operation is incorporated in both designs illustrated.

In the operation of this new and improved tail gate chain latch, the gate 11 is opened to the desired distance and the chain 16 dropped into the vertical slot 19 and moved sidewise along the horizontal slot 20, as shown in the left hand position, Figure 1, the free end 25 of the chain 16 is then brought over and dropped into the vertical slot 22, holding the link 18 in holding or latched position.

In order to release the chain 16, the free end 25 is raised lifting the link 18 from the slot 22, after which the chain 16 can be moved horizontally out of the slot 20, as illustrated in Figure 3, without having to move the tail gate 11 inwardly against an obstruction 23 lodged between the bed of the truck B and the tail gate 11, as best illustrated in Figure 2.

Having thus described the preferred embodiments of the invention, it should be understood that numerous structural modifications and adaptations may be resorted to without departing from the scope of the appended claims.

What is claimed is:

1. A truck body comprising a bed, upstanding side walls secured to said bed, a tail gate pivotally secured at its upper end to the upper rear end of said side walls, a latch chain having one end thereof secured beneath the rear end of said bed, and a latch plate welded to said tail gate adjacent the lower end thereof, said latch plate having a vertical chain receiving slot opening through the upper edge thereof with a horizontal chain receiving slot communicating with the lower end of said vertically extending chain receiving slot, said latch plate having a second vertically extending chain receiving slot laterally spaced from said first named vertical chain receiving slot, said second vertical slot opening through the upper edge of said latch plate on the side of said first vertically extending chain receiving slot adjacent said horizontally extending chain receiving slot.

2. A tail gate for truck bodies comprising a generally rectangular frame, a tail gate panel secured to said rectangular frame, a latch plate secured to said rectangular frame in rearwardly spaced relation to said tail gate panel for cooperative engagement with a latch chain on said truck body, said latch plate having a horizontally extending chain receiving slot and laterally spaced therefrom a vertically extending chain receiving slot, said last named slot detachably retaining the latch chain in latching position in said first named slot, said vertically extending slot opening through the upper edge of said latch plate and a second laterally spaced vertical slot intersecting said horizontally extending slot and the upper edge of said latch plate.

References Cited in the file of this patent

UNITED STATES PATENTS

| | | |
|---|---|---|
| 1,117,930 | Turner | Nov. 17, 1914 |
| 1,496,793 | Unger | June 10, 1924 |
| 1,850,367 | Winter | Mar. 22, 1932 |
| 2,246,358 | Jelinek et al. | June 17, 1941 |